United States Patent [19]
Reichle

[11] Patent Number: 5,816,863
[45] Date of Patent: Oct. 6, 1998

[54] MODULAR MULTIPLE TERMINAL BLOCK FOR CABLE CONNECTIONS TO A MAIN DISTRIBUTING FRAME FOR TELECOMMUNICATION AND DATA LINES

[75] Inventor: Hans Reichle, Wetzikon, Switzerland

[73] Assignee: Reichle+De-Massari AG, Wetzikon, Switzerland

[21] Appl. No.: 711,150

[22] Filed: Sep. 10, 1996

[30] Foreign Application Priority Data

Sep. 21, 1995 [CH] Switzerland .......................... 02668/95

[51] Int. Cl.$^6$ ....................................................... H01R 9/22
[52] U.S. Cl. ............................................................. 439/717
[58] Field of Search ................................... 439/709, 717, 439/715, 922, 509, 213, 511

[56] References Cited

U.S. PATENT DOCUMENTS 5,622,516  4/1997  Baggett et al. .......................... 439/922

FOREIGN PATENT DOCUMENTS 43 06 349  3/1994  Germany .

Primary Examiner—Hien Vu
Assistant Examiner—Yong Ki Kim
Attorney, Agent, or Firm—Spencer & Frank

[57] ABSTRACT

The modular multiple terminal block for cable connections, especially for a main distributing frame for telecommunications and data lines, is created in such a way that each of the terminal blocks which can be mounted next to one another in a frame for the wires (3') of both the line cable (3') and the switchboard cable are provided with a number of separate modular contact springs extending from one narrow inner longitudinal side of a flat housing to the other with an insulation displacement contact area for solderless connections of the wires. The free ends of the contact springs serve to create a direct contact with the contact springs of connectable connecting plugs and/or jumpering plugs and/or with an overvoltage connection case.

This enables the creation of a new generation of distributing systems in which distributing blocks with plug and socket connections can be abandoned completely, the contacts are of considerably simpler configuration, and the volume of the system is reduced further by directly connecting terminal blocks which are designed as distributing elements to the line and switchboard cables instead of by means of the formerly used plugs.

5 Claims, 2 Drawing Sheets

MODULAR MULTIPLE TERMINAL BLOCK FOR CABLE CONNECTIONS TO A MAIN DISTRIBUTING FRAME FOR TELECOMMUNICATION AND DATA LINES

BACKGROUND OF THE INVENTION

The present invention relates to a modular multiple terminal block for cable connections, and especially to a main distributing frame for telecommunication and data lines.

With known main distributing frames, the modular multiple terminal blocks are designed for both user-network cable wires and switchboard cable wires which are plugged into distributor blocks and connected via contact elements, whereby the contact arrangements of the distributor blocks comprise overplugging contacts and test points designed to receive break plugs, test plugs and jumpering plugs.

This type of distribution device is known from DE-43 06 349, whereby the attempt was made to incorporate the previously common two working sides, which take up a relatively large amount of space, namely the connection side and the manipulation side of this type of device, on one side of the distributing frame. This was achieved by attaching the plugs of the user-network network cable (line cable) and the switchboard cable (central cable) to the rear of the distributor block and connecting them to a relatively complicated contact system which permits the connection of jumpering plugs, break plugs and overvoltage protection to the front of the distributor blocks. This type of arrangement is quite expensive.

SUMMARY OF THE INVENTION

The purpose of the present invention is to create a modular multiple terminal block for cable connections, especially to a main distributing frame for telecommunication and data lines of the type described above, which permits the use of a main distributing frame of a much simpler design.

This purpose is fulfilled according to the invention in that each of the terminal blocks for the wires of both the line and the switchboard cables are provided with a number of separate modular contact arrangements which create directly connectable overplugging and/or break contacts with the contact arrangements of connectable connection and/or plugging means.

When doing so, each of the terminal blocks for the wires of both the line and switchboard cables which can be mounted next to one another in a frame are provided with a number of separate modular contact springs extending from one narrow inner longitudinal side of a flat housing to the other with insulation displacement contact areas for a solderless connection to the wires. The free ends of the contact springs serve to create a direct connection to the contacts of connectable connecting plugs and/or jumpering plugs and/or to a connectable overvoltage protection case.

These measures permit the creation of a new generation of distributing systems in which distributing blocks with plug and socket connections are completely eliminated. Further, the contacts are of considerably simpler design, and the volume of the system is reduced due to the terminal blocks being directly connected as distributing elements instead of the previously common plugs being connected to the line and switchboard cables. Thus, at least the switchboard cable can be produced beforehand as standard equipment.

Equivalent or reverse circuits, e.g., from a new system to the old main distributing frame, are possible with a preferable embodiment of the invention. In particular, the narrow longitudinal sides of the terminal blocks can be connected, whereby the free ends of the contact springs of both connected terminal blocks are in contact. In this case, functions such as overvoltage protection, testing, breaking and jumpering are maintained in full.

As a result, a through-connection of the switchboard and the line sides can be created in an extremely simple manner. The aligned free ends of contact springs of pairs of allocated terminal blocks can be directly connected for a line or switchboard cable from the bow-shaped contact of the connecting plug. The break contacts created in such a way can be broken with a testing plug, etc.

When this is done, reliable connections and testing are ensured in that parallel guides for the connection and plugging means are located near the free ends of the contact springs for the simultaneous creation of contacts by means of connecting plugs or jumpering plugs and testing plugs.

BRIEF DESCRIPTION OF THE DRAWINGS

Examples of embodiments of the object of the invention are described in more detail on the basis of the drawings. The following is shown.

DETAILED DESCRIPTION OF THE INVENTION

Figure 1:
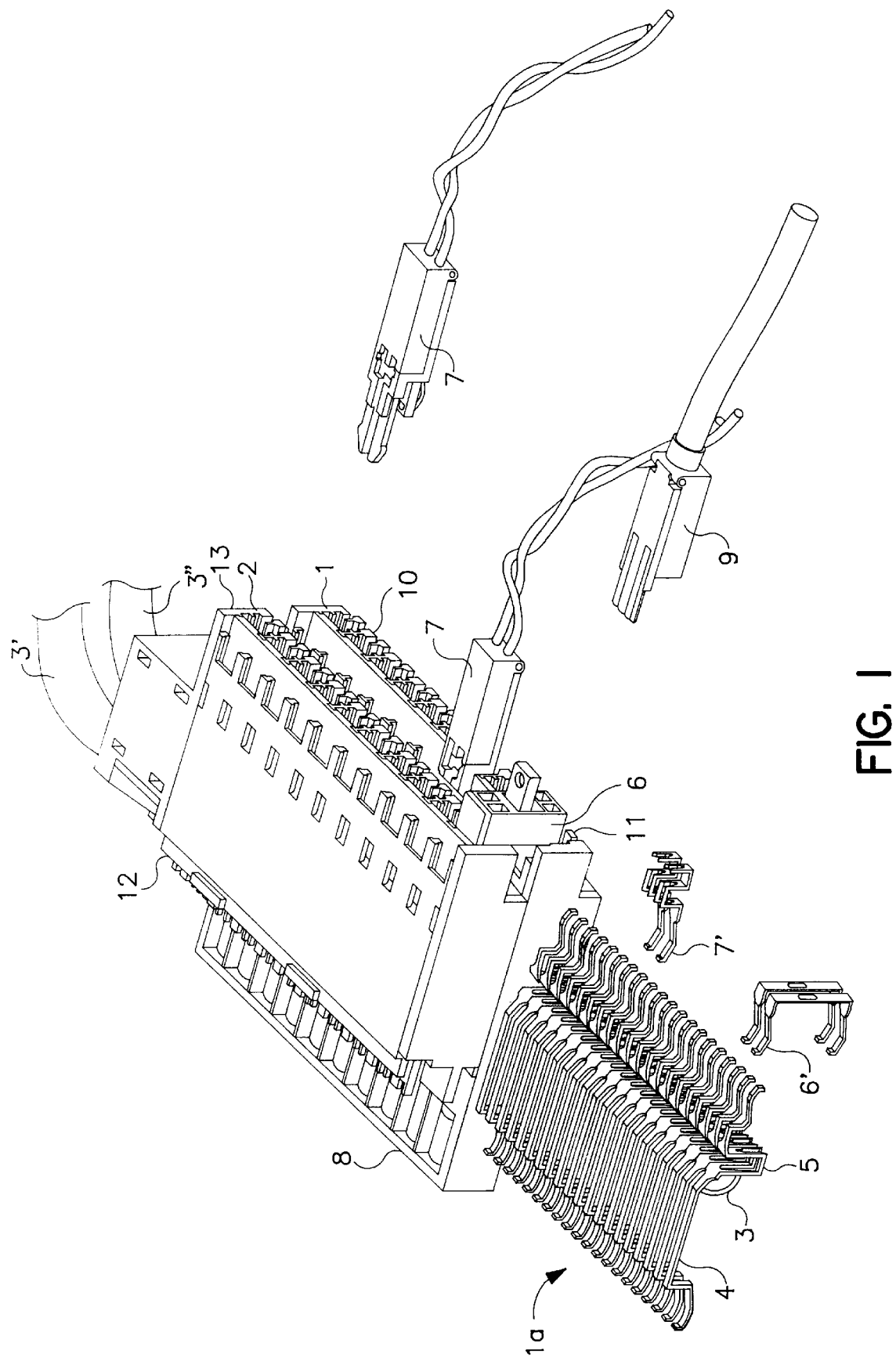
FIG. 1 is a diagram of a distributing system constructed with the terminal blocks according to the invention for overplugging line and switchboard cables.

Each of the modular multiple terminal blocks 1 and 2 which can be connected next to one another in a frame (not shown) for receiving the wires 3 of both the line cable 3' and the switchboard cable 3" are provided with a number of separate modular contact springs 4 extending from one narrow inner longitudinal side 12 of a flat housing 1', 2' to the other side 13. The contact springs 4 have an insulation displacement contact area 5 for a solderless contact of the wires 3, as can be seen in the part 1a of a terminal block 1 shown without a housing in FIG. 1.

In this case, the free ends of the contact springs 4 serve to create direct contacts with the contact springs 6' of connectable connecting plugs 6 and/or with the contact springs 7' of jumpering plugs 7 and/or of a connectable overvoltage protection case 8.

Figure 2:
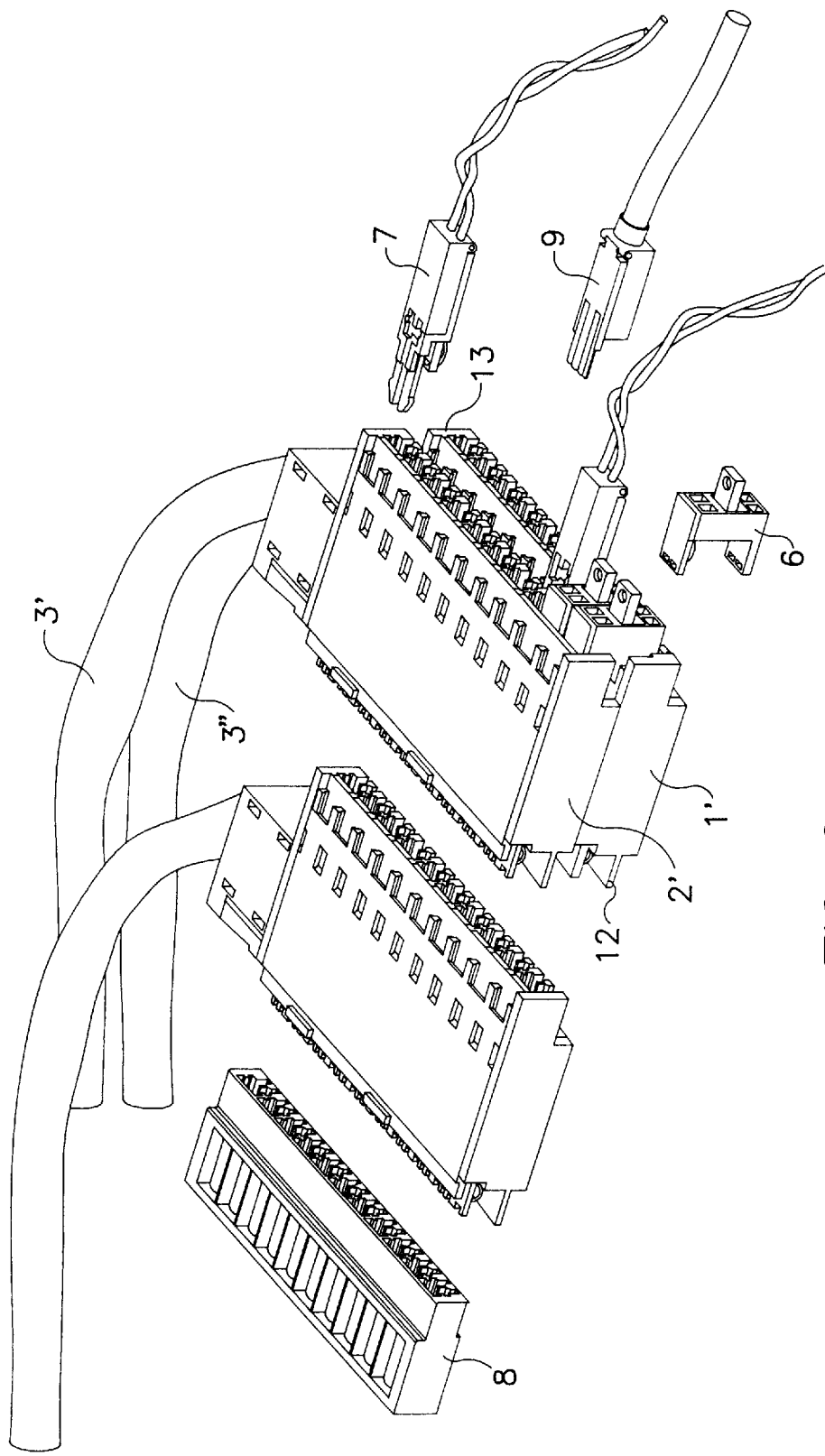
FIG. 2 is a diagram of an embodiment of the arrangement as shown in FIG. 1 with a reverse circuit to the old distributor.

Equivalent or reverse circuit circuits, such as from the new system to the old main distributing frame, can be created as desired when the terminal blocks 1, 2 are connected on top of one another along their narrow longitudinal sides 12, 13, using, for example, connecting plugs 6, as shown in FIG. 2, whereby the free ends of the contact springs 4 of both connected terminal blocks are in contact. When this is done, functions such as overvoltage protection, testing , breaking and jumpering are maintained in full as shown with the arrangement in FIG. 1.

The simplest possible through-connection of the switchboard and line sides cables 3', 3" can be created when the aligned free ends of contact springs 4 of pairs of allocated terminal blocks 1 and 2 can be directly connected for a line 3' or switchboard cable 3" using the bow-shaped contact 6' of the connecting plug 6, whereby the break contacts created in this way can be broken with a testing plug 9, etc.

The measures described offer the primary advantages that distributing blocks with plug and socket connections are completely eliminated, the contacts are of considerably simpler design, and the volume of the system is reduced further in that distributing elements are directly connected instead of the plugs formerly used for the line and switchboard cables. When this is done, locating parallel guides 10, 11 near the free ends of the contact springs 4 for the connection and plugging means to simultaneously create contacts by means of connecting plugs 6 or jumpering plugs 7 and testing plugs 9 is advantageous. This permits the performance of tests independently of the connected connection. Furthermore, the terminal blocks can be used as pure jumpering plugs and card edge connectors. In addition, printed circuit boards, etc. can be connected to create parallel connections, etc. Furthermore, current protection which is independent of the overvoltage connection case can be provided by installing current protection means in the housing of the connecting plugs and jumpering plugs.

What is claimed is:

1. A modular block assembly comprising
   (a) first and second terminal blocks each having
      (1) a flat housing having a length and opposite first and second narrow sides extending parallel to said length; and
      (2) a plurality of spaced first contacts accommodated in said housing and forming a contact series extending along said length; said first contacts extending transversely to the housing length and including securing means for holding wires of first and second cables to be coupled to said first and second terminal blocks; said securing means comprising an insulation displacement contact area of said first contacts for forming a solderless connection between a respective wire and said first contacts; each said first contact having a free end; and
   (b) a connecting plug having second contacts connected to selected said first contacts; the free ends of said first contacts directly contacting respective said second contacts of said connecting plug; said selected first contacts and said second contacts together forming one of directly connecting overplugging contacts and directly connecting break contacts; one of said second contacts of said connecting plug being a bow-shaped contact directly connecting two aligned first contacts of said first and second terminal blocks to form a break contact breakable by a testing plug.

2. The modular block assembly as defined in claim 1, wherein said first and second modular blocks include parallel guides; each said guide being located in a region of said free ends of said first contacts for receiving and contacting the external device.

3. The modular block assembly as defined in claim 1, wherein said modular block assembly forms a main distributing frame for telecommunications and data cables.

4. The modular block assembly as defined in claim 1, wherein said first and second contacts are contact springs.

5. The modular block assembly as defined in claim 1, wherein said first and second terminal blocks are superposed on one another and further wherein said first contacts of said first terminal block are in alignment with said first contacts of said second terminal block.

* * * * *